(12) United States Patent
Dorrance et al.

(10) Patent No.: US 6,894,771 B1
(45) Date of Patent: May 17, 2005

(54) WHEEL ALIGNMENT APPARATUS AND METHOD UTILIZING THREE-DIMENSIONAL IMAGING

(75) Inventors: Daniel R. Dorrance, Ballwin, MO (US); Nicholas J. Colarelli, III, St. Louis, MO (US); Timothy A. Strege, Ballwin, MO (US); Thomas J. Golab, St. Peters, MO (US); David Voeller, St. Louis, MO (US); Mark S. Shylanski, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 78 days.

(21) Appl. No.: 10/439,153

(22) Filed: May 15, 2003

Related U.S. Application Data
(60) Provisional application No. 60/378,123, filed on May 15, 2002.

(51) Int. Cl.[7] .......................... G01B 11/26; G01B 13/18
(52) U.S. Cl. ................. 356/139.09; 33/203.18
(58) Field of Search .................. 356/139.09; 33/203.18

(56) References Cited

U.S. PATENT DOCUMENTS

| | | | |
|---|---|---|---|
| 4,319,838 A | 3/1982 | Grossman et al. | |
| 4,745,469 A | 5/1988 | Waldecker et al. | |
| 4,879,670 A | 11/1989 | Colarelli, III | |
| RE33,144 E | 1/1990 | Hunter et al. | |
| 4,899,218 A | 2/1990 | Waldecker et al. | |
| 5,268,731 A | 12/1993 | Fuchiwaki et al. | |
| 5,488,472 A | 1/1996 | January | |
| 5,532,816 A * | 7/1996 | Spann et al. ........... | 356/139.09 |
| 5,535,522 A | 7/1996 | Jackson | |
| 5,675,515 A | 10/1997 | January | |
| 5,724,128 A | 3/1998 | January | |
| 5,724,129 A * | 3/1998 | Matteucci | |
| 5,818,574 A * | 10/1998 | Jones et al. ........... | 356/139.09 |
| 6,064,750 A * | 5/2000 | January et al. | |
| 6,134,792 A | 10/2000 | January | |
| 6,298,284 B1 | 10/2001 | Burns, Jr. et al. | |
| 6,323,942 B1 | 11/2001 | Bamji | |
| 6,341,013 B1 | 1/2002 | Battiti et al. | |
| 6,526,665 B2 * | 3/2003 | Jackson | |
| 2001/0048529 A1 | 12/2001 | Bamji | |
| 2002/0021287 A1 | 2/2002 | Tomasi et al. | |
| 2002/0027651 A1 * | 3/2002 | Jackson et al. | |

FOREIGN PATENT DOCUMENTS
DE 2948573 6/1981

OTHER PUBLICATIONS
Selected pages from www.canesta.com.
IEEE Spectrum—May 2002.
Selected pages from www.fki–et.com.
Selected pages from www.aue–kassel.de.
Selected pages from www.optikon.ca.
Selected pages from www.acuityresearch.com.
Selected pages from www.laseroptronix.com.
Daniel B. January/SAE Technical Paper Series, Steering Geometry and Caster Measurement/Feb. 25–Mar. 1, 1985.

* cited by examiner

Primary Examiner—Stephen C. Buczinski
(74) Attorney, Agent, or Firm—Polster, Lieder, Woodruff & Lucchesi, L.C.

(57) ABSTRACT

A vehicle wheel alignment system utilizing one or more optical imaging sensors to acquire either images gradient brightness optical targets affixed to vehicle wheels, or direct images, of the vehicle wheels, from which three-dimensional information related to one or more vehicle wheel alignment angles can be obtained.

43 Claims, 6 Drawing Sheets

WHEEL ALIGNMENT APPARATUS AND METHOD UTILIZING THREE-DIMENSIONAL IMAGING

CROSS-REFERENCE TO RELATED APPLICATIONS

The present application is related to, and claims priority from, U.S. Provisional Patent Application No. 60/378,123 filed on May 15, 2002, herein incorporated by reference.

STATEMENT REGARDING FEDERALLY SPONSORED RESEARCH

Not Applicable.

BACKGROUND OF THE INVENTION

The present invention relates to vehicle wheel alignment systems, and in particular to an improved non-contact vehicle wheel alignment system utilizing one or more optical imaging sensors to acquire images of a vehicle from which three-dimensional information on one or more current vehicle wheel alignment angles can be obtained.

Various systems have been designed to determine vehicle wheel alignment angles. Originally, vehicle wheel alignment angles were measured directly by alignment angle sensors mounted to the vehicle wheels. For example, U.S. Reissue Pat. No. 33,144 to Hunter et al. and U.S. Pat. No. 4,319,838 to Grosssman et al. each describe vehicle wheel alignment systems which use electro-optical transducers to determine the toe alignment angles of a vehicle. In these systems, six or more electro-optical transducers are carried by support assemblies which are mounted to the vehicle wheels, two on each front wheel, and one on each rear wheel. The '144 Hunter et al. patent and the '838 Grossman et al. patent further describe and illustrate the various wheel alignment angles which can be directly measured using the electro-optical transducers, and how to compute additional angles from these directly measured angles.

In addition to the electro-optical transducers used to measure wheel angles, a gravity-referenced inclinometer, such as shown in U.S. Pat. No. 4,879,670 to Colarelli may also be used. Gravity-referenced inclinometers can be mounted to the vehicle wheels to provide measurements of the wheel camber angle, assuming that the vehicle, while being measured, is resting on a flat and level surface. SAE Publication No. 850219, entitled "Steering Geometry and Caster Measurement" by January, derives and discusses the industry standard procedures and methods by which toe and camber wheel alignment angle transducers are used to determine the caster and steering axis inclination (SAI) angles of the vehicle.

Equipment of this general type, and the use of the apparatus and method set forth above, is well known in the vehicle wheel alignment industry. Such equipment is capable of determining the camber, caster, and toe alignment angles of the wheels of a vehicle relative to one or more appropriate reference axes, and is sufficient to permit proper adjustment of the vehicle wheel alignment so as to reduce tire wear and provide for safe vehicle handling.

An alternative type of vehicle wheel alignment system which has become increasingly popular is what is commonly referred to as an "external reference aligner". U.S. Pat. Nos. 4,745,469 and 4,899,218, both to Waldecker et al. illustrate how lasers may be used to illuminate the tires of a vehicle with structured light, and cameras used to capture images of the illuminated tires. These patents further describe how "machine vision techniques" are employed to process the obtained images and to determine distances between the cameras and locations on the tire sidewalls, thereby allowing a determination of the locations and orientations of the vehicle wheels in a coordinate system relative to the cameras. Subsequent processing of the determined locations and orientations identifies conventional wheel alignment angles such as toe, camber, and caster for the imaged vehicle wheels.

German Patent No. DE 29 48 573 A1, assigned to Siemens AG, describes the use of cameras to determine the locations and orientations of the wheels of a vehicle. On one side of the vehicle, a single camera is moved to multiple positions to view the vehicle wheels and obtain multiple images of the known ellipse formed by the wheel rim. Alternatively, a single fixed camera is used at each side of the vehicle in conjunction with movable mirrors, or multiple cameras may be used to obtain the multiple images. The system examines the sets of images of the rim ellipses thus viewed for each of the wheels of the vehicle, identifies major and minor ellipse axes, and subsequently determines the locations and orientations of the wheels. Using this determined information, the conventional wheel alignment parameters are identified.

Continued development in the industry of "external reference aligners" is shown in a series of patents related to U.S. Pat. No. 5,675,515 to January, and in a series of patents related to U.S. Pat. No. 5,535,522 to Jackson. These patents describe and disclose various embodiments of "external reference aligners" and vehicle wheel alignment systems in which optical targets of known configurations having contrasting surfaces are mounted to the wheels of a vehicle undergoing alignment. Images of the known optical targets are obtained by one or more camera systems, and processed to determined relative positions, orientations, and rotational axes in three-dimensional space. From the relative positions, orientations, and rotational axes of the targets, corresponding information about the associated vehicle wheels is calculated, and conventional wheel alignment angles identified.

The optical targets of known configurations employed in conventional "external reference aligner" systems typically consist of high contrast geometric shapes such as circles, squares, or triangles. The accuracy of such an optical target is dependent upon how well the high contrast edge of the geometric shapes can be located in the pixellated image produced by the machine vision camera system observing the target. For the best accuracy, the high contrast geometric shapes must be separated from each other on the face of the target by a distance which is sufficient to prevent the apparent fusing of adjacent shapes into a single shape when reduced edge sharpness causes two shapes to bleed into the same image pixel. These factors combine to limit the number of pixels in an image whose values are utilized to calculate the position and orientation of the optical target to a very small portion of the pixels in the image which represent the target. Typically, only a small percentage of the pixels in the image of a target are used to calculate the position and orientation of a high-contrast optical target.

Accordingly, an increase in performance and functionality of external reference vehicle wheel alignment systems would be greatly beneficial. One possibility for increasing performance and functionality would be to provide a target design which provides a high percentage of useful image pixels for purposes of determining target position and orientation. An alternative improvement would be the elimination of the need for costly known optical targets in a system which is capable of determining the position, orientation, and rotational axes of one or more vehicle wheels directly from images obtained by one or more imaging systems configured to observe and track multiple points on a vehicle wheel without the need for highly precise attached optical targets.

BRIEF SUMMARY OF THE INVENTION

Briefly stated, a wheel alignment apparatus of the present invention determines the alignment of the wheels of a vehicle. The apparatus includes at least a first camera disposed to receive images of the one or more wheels on one side of the vehicle and at least a second camera disposed to receive images of the one or more wheels on the opposite side of the vehicle. A computer is operatively connected to the cameras, and is responsive to the images generated thereby to determine values of wheel alignment parameters of the vehicle. In a first embodiment, planar gradient targets are mounted on the front and rear wheels of a vehicle, and the cameras are utilized to obtain images of the planar gradient targets, from which the computer is configured to determine vehicle wheel alignment angles.

In an alternate embodiment of the present invention, the computer is configured to identify a plurality of random features visible on the surfaces of the vehicle wheel and tire assemblies instead of predetermined targets, and to utilize the identified random features to determine vehicle wheel alignment angles.

In a next alternate embodiment of the present invention, the imaging components in the wheel alignment apparatus are configured with imaging elements which are capable of providing range-to-target or time-of-flight information for each pixel in an image. The computer is configured to utilize the range-to-target or time-of-flight information received for pixels representing surfaces of the vehicle wheel and tire assemblies to determine vehicle wheel alignment angles.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 18 is a simplified representation of the placement of imaging components at fixed positions adjacent a vehicle lift rack.

Corresponding reference numerals indicate corresponding parts throughout the several Figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
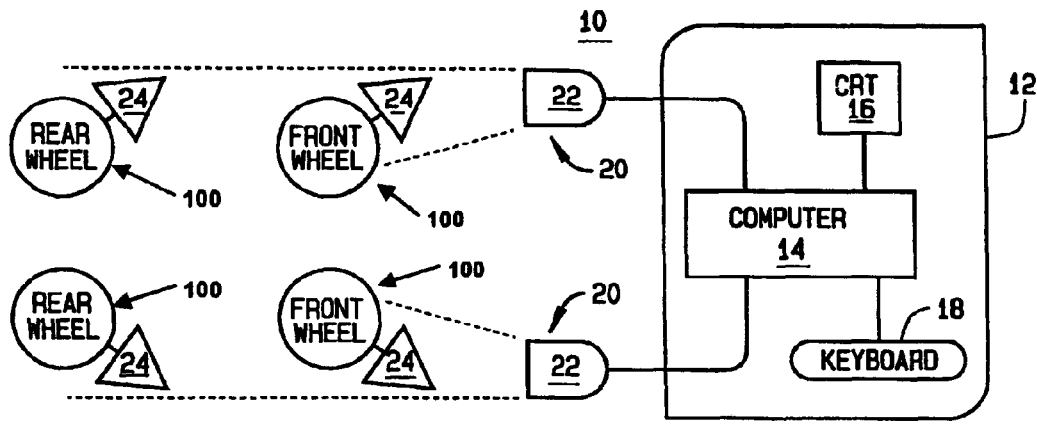
FIG. 1 is a block diagram of a prior art wheel alignment imaging system.

It is preferred that the present invention be embodied as an improvement to a computer controlled optical imaging vehicle wheel alignment system, shown generally in FIG. 1 at 10, such as is set forth and described in U.S. Pat. No. 5,675,515 to January, and U.S. Pat. No. 6,298,284 B1 to Burns, Jr. et al., each herein incorporated by reference. The optical imaging vehicle wheel alignment system 10 consists generally of a console 12 having a computer or microprocessor 14, one or more display devices 16, such as a monitor, and one or more input devices 18, such as a keyboard. The computer or microprocessor 14 is configured with one or more software applications, at least one of which is adapted to facilitate the alignment of vehicle wheels, which consist of a rim and an associated tire, using input received from one or more imaging components 20. In an optical imaging vehicle wheel alignment system 10, the imaging components 20 are part of a camera system or imaging system 22 configured to view one or more optical targets 24 to obtain images thereof for processing by the software application.

Figure 2:
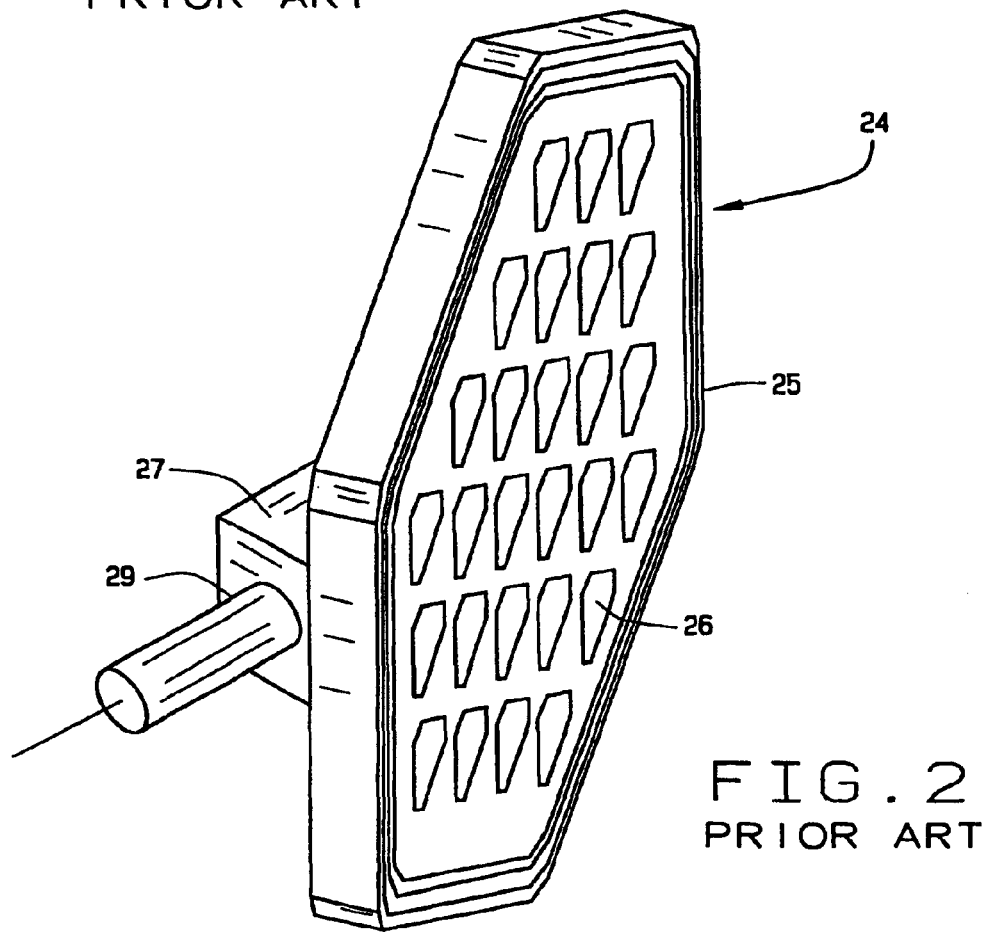
FIG. 2 is a representation of a prior art optical target utilizing high-contrast black and white optical elements.
Figure 1B:
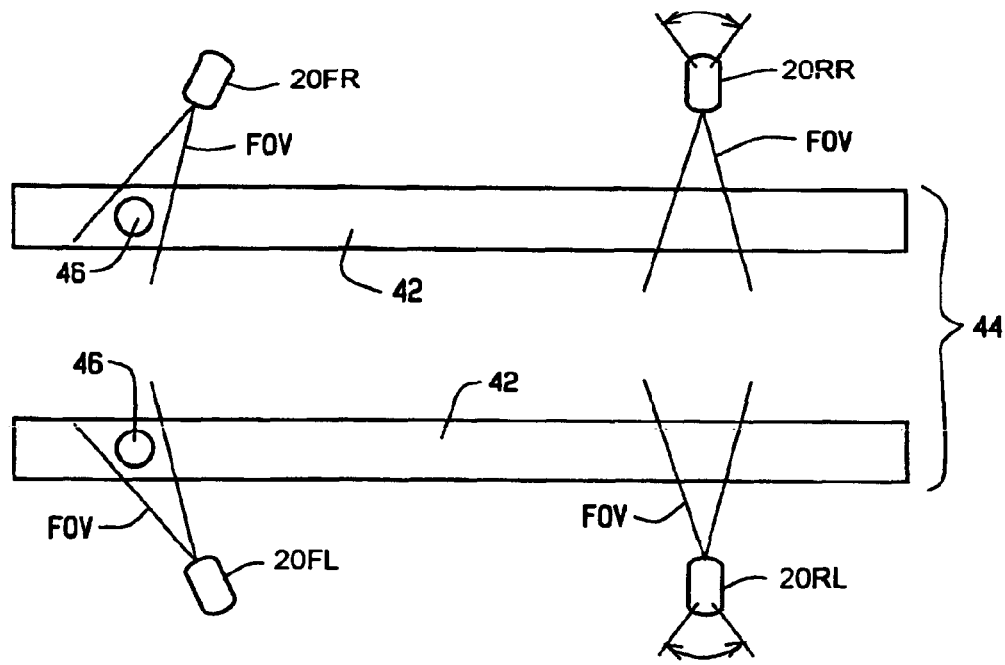

A conventional configuration of an optical target 24 is shown in FIG. 2, and is described in U.S. Pat. No. 6,064,750 to January, and U.S. Pat. No. 6,134,792 to January, each herein incorporated by reference. Each optical target 24 consists of a target face 25, on which are disposed optical elements 26, a base 27, and a mounting shaft 29. An exemplary computer controlled optical imaging vehicle wheel alignment system 10 is the Series 611 Wheel Alignment System utilizing the DSP 400 Series sensors, manufactured and sold by Hunter Engineering Company of Bridgeton, Mo.

As shown in FIG. 2, the conventional configuration for an optical target 24 employed with an optical imaging vehicle wheel alignment systems 10 is precisely engineered with high-contrast geometric shapes 26 such as circles, squares, or triangles. The accuracy of such conventionally configured optical targets 24 is dependant upon how well the high contrast edges of the optical target elements 26 can be located in a pixellated image produced by the imaging system 22 of the optical imaging vehicle wheel alignment system 10. For the best accuracy, the individual optical elements 26 must be large enough to have relatively long straight or curved boundaries, and they must be separated far enough to prevent the individual optical target elements 26 from appearing to fuse into a single object when reduced edge sharpness causes two or more optical target elements 26 to bleed into the same pixel in the imaging system 22. These factors combine to limit the number of individual image pixels generated by the imaging system 22 whose values are utilized to calculate a position and orientation of a conventionally configured optical target 24.

Each image of conventional high-contrast optical targets 24 acquired by the optical imaging vehicle wheel alignment system 10 are processed to identify a number of reference points in the image. Either the computer 14 or the imaging system 22 itself is configured to mathematically manipulate the positional relationships of the observed reference points, as identified in an image, to match them with a set of predetermined positional relationships based on the known parameters of the conventional high-contrast optical target 24. Once the relationship between the observed positional relationships and the predetermined positional relationships is identified for the reference points, the position and orientation in three-dimensional space of the target (and an associated vehicle wheel) relative to the position and orientation of the imaging system is identified, from which one or more vehicle wheel alignment angles can be identified. Accordingly, for an optical imaging vehicle wheel alignment system 10 to function, it is necessary for the system 10 to be capable of extracting a set of control or reference points from acquired images.

In a preferred embodiment of the present invention, the requirement for attaching high-contrast and predetermined optical targets 24 is eliminated. Rather than acquire images of predetermined optical targets 24, the imaging system 22 is configured to acquire one or more images of at least a portion of each of the vehicle wheels 100, and to identify a plurality of random local features 102 disposed on the vehicle wheel 100, in each image, from which sufficient reference point information can be determined to identify one or more wheel alignment angles.

The random local features 102 identified in each image correspond to features arrayed on the surface of the wheel 400, either on the wheel rim itself, or on those portions of the tire which are not distorted due to the weight of the vehicle. When a sequence of images are acquired by the imaging system 22 for the vehicle wheel 100 in a series of rotational positions, the wheel 100 is modeled as a solid object rotating about a single axis between the images. A minimum number of random local features 102 which can be identified in the series of images of the vehicle wheel 100 at different rotational positions are selected by the imaging system 22. From these easily identifiable local features 102, the motion of the vehicle wheel 100 between each of the images is determined by matching the local feature position changes in the series of images with those predicted for rotation of the vehicle wheel 100. Once the vehicle wheel 100 rotation is known, spatial relationships between the easily identifiable random local features 102 and other two-dimensional random local features can be used to determine correct correspondence between two dimensional random local features 102 in multiple images, and thereby provide control points for alignment computation.

Figure 3:
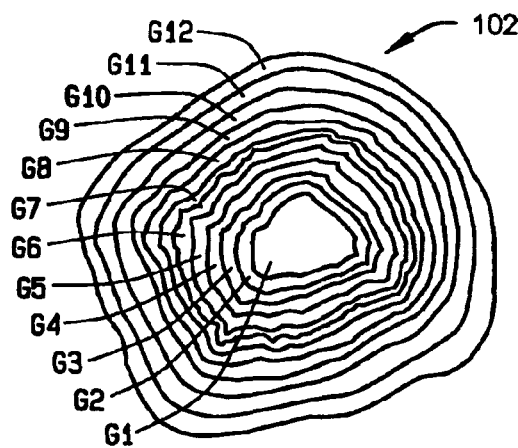
FIG. 3 is a gradient representation of a random local feature in an image.
Figure 4:
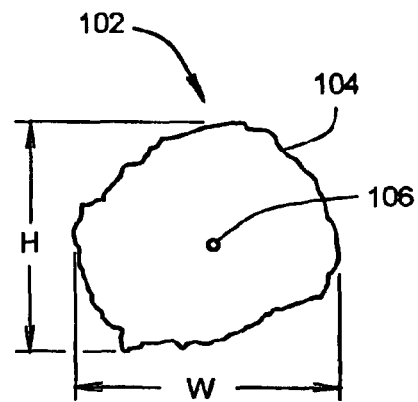
FIG. 4 is a representation of the characteristics of the random local feature shown in FIG. 3 at a selected gradient threshold.

Preferably, a suitable random local feature 102 is anything present in an image of at least a portion of a vehicle wheel 100 having a closed border 104 consisting of more than one image pixel. The closed border 104 is normally defined by a brightness gradient limit (threshold) or a gray-scale line gradient magnitude limit which is selected based on the parameters of the imaging system components. As shown in FIGS. 3 and 4, if an exemplary random local feature 102 identified in an image consists of a gray-scale gradient from dark to light represented by the numbers G1 through G12, and the gradient limit (threshold) is set at between G6 and G7 then the closed border 104 for the exemplary random local feature 102 would be defined as shown in FIG. 4.

Once the closed border 104 for a particular random local feature 102 is established, various statistics can be used to uniquely identify the random local feature 102 as the vehicle wheel 100 is rotated about an axis from a first position to a subsequent position. For example, as shown in FIG. 4, a width "W", a height "H" and centroid 106 of the random local feature 102 may be computed using standard image processing techniques.

Figure 5:
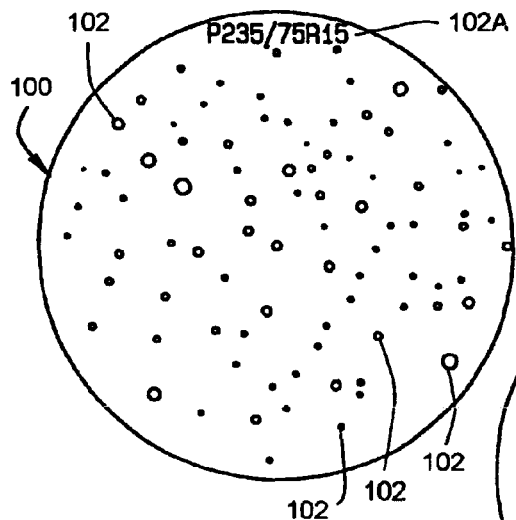
FIG. 5 is a representation of the wheel portion of an image, illustrating a plurality of random local features.

As shown in FIG. 5, once an image of a vehicle wheel 100 is obtained by an imaging component 20, and preliminarily processed by the imaging system to identify the portion of the image which is representative of the face of the vehicle wheel 100, a multitude of random local features 102 may be identified within the boundaries of the vehicle wheel 100. These random local features 102 can consist of any identifiable element found on any portion of the vehicle wheel 100, such as the rim or the tire. Preferably, the random local features 102 are selected from features which are unlikely to change during the vehicle wheel alignment procedure, such as the common lettering 102A found on a tire, scuff marks, scratches, wheel lug nuts, wheel rim elements, or a splattering of dried mud. Alternatively, the random local features 102 could be selected from a set of local features temporarily applied to the vehicle wheel, such as a plurality of stick-on local features, or spots of sprayed-on liquids. An ideal spray-on liquid is one which dries quickly, is not easily removed without washing, and that can be seen only when a black or ultraviolet light is used to illuminate the wheel 100. A company that specializes in making products that are illuminated under ultraviolet light (black light) is Beaver Luminescers of Newton, Mass.

Figure 6:
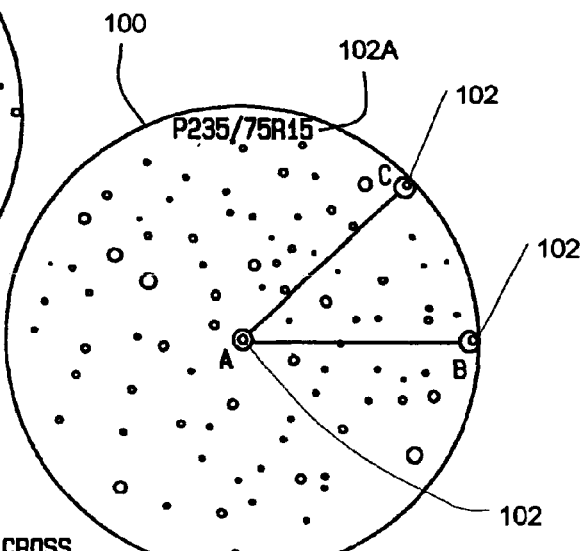
FIG. 6 illustrates the selection of a set of local features in the image of FIG. 5.
Figure 7:
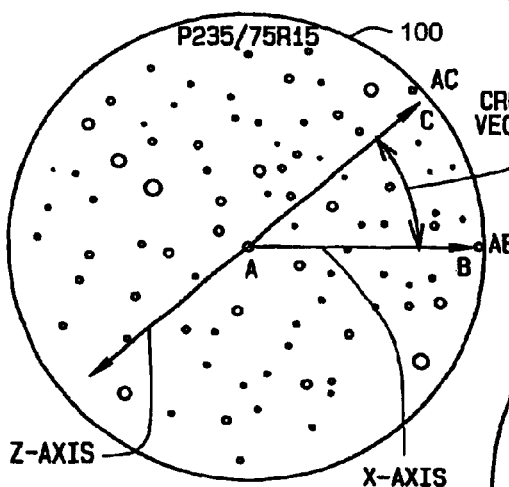
FIG. 7 illustrates the use of the set of local features shown in FIG. 6 to establish a wheel X-axis and a wheel Z-axis.
Figure 8:
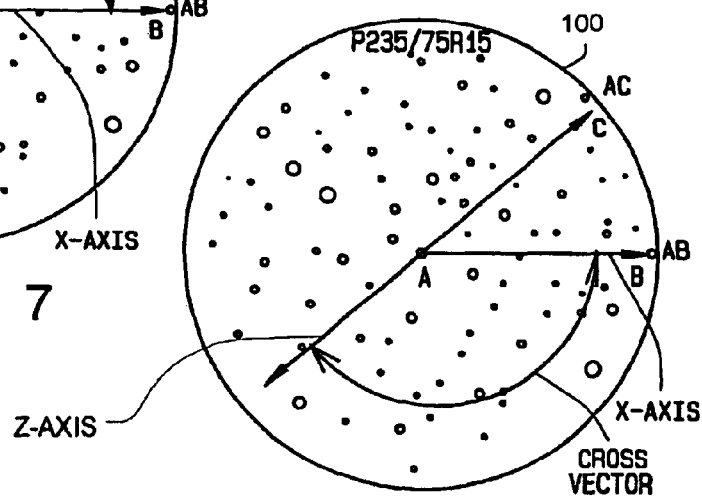
FIG. 8 illustrates the use of the set of local features shown in FIG. 6 and the established Z-axis to establish a wheel Y-axis.
Figure 9:
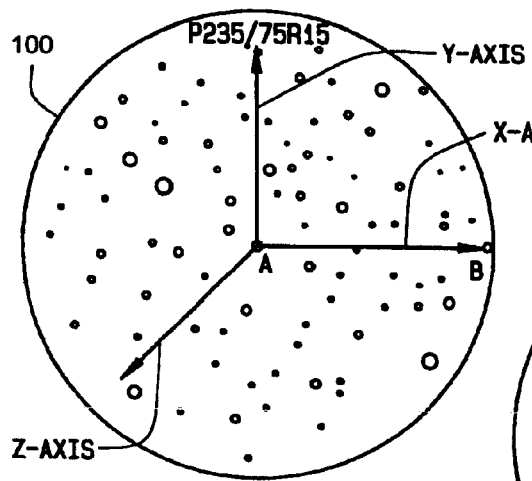
FIG. 9 illustrates the established X, Y, and Z-axes for the wheel of FIG. 5.

A preferred method for processing an image and the random local features 102 present therein to obtain information from which vehicle wheel alignment angles can be determined is shown in FIG. 6 in which two random vectors AB and AC are created from three arbitrary local features 102 selected in the image, identified as A, B, and C. Preferably, at least one of the local features 102 identified as A, B, and C is selected to lie near the center of the image of the vehicle wheel 100. The vector AB is utilized to define an X-axis. A cross vector is calculated between vector AB and vector AC to establish a Z-axis, as shown in FIG. 7. A second cross vector is calculated between the vector AB and the established Z-axis, as shown in FIG. 8, to establish the Y-axis. The resulting X-Y-Z axes in a wheel-based Cartesian coordinate system are shown in FIG. 9.

Figure 10:
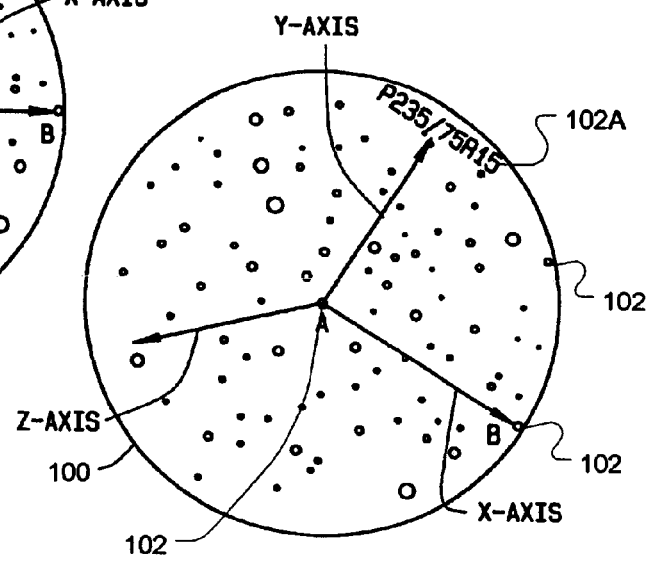
FIG. 10 illustrates the effect of rotation of the wheel on the established axes of FIG. 9.

Once the X-Y-Z axis wheel-based Cartesian coordinate system, i.e., a target coordinate system, has been established, the locations for a selected set of identified random local features 102 present in the image are fixed within the established Cartesian coordinate system. If the vehicle wheel 100 changes in yaw, pitch, and/or roll, the locations for these identified random local features 102 will not change within the established wheel-based Cartesian coordinate system, as illustrated in FIG. 10. In essence, once identified, the set of selected random local features 102 on the surface of the vehicle wheel 100 function in the same manner as the optical elements of a predetermined optical target, providing a plurality of discrete reference or control points which can be computationally modeled by the imaging system 22 to identify parameters related to vehicle wheel alignment angles.

During operation, each imaging component 20 preferably resolves a minimum number of random local features 102 located on the surface of associated vehicle wheels 100. An image of each vehicle wheel 100 at a first position is matched to a second image of the same vehicle wheel 100 moved to a subsequent placement, which may have either a different position, a different orientation, or both. A minimum number of images, preferably two, are used to establish which random local features 102 contained in the images can be used to establish reference or control points for purposes of determining the position of the vehicle wheel 100, i.e. the Axis Of Rotation—AOR of the vehicle wheel 100. The AOR is calculated using known facts about each selected local feature 102, such as the centroid, height, width, area, etc., in combination with known pattern recognition techniques.

Conventional non-contact optical vehicle wheel alignment systems 10, such as those described in the referenced U.S. Patents to January, determine an AOR of a vehicle wheel 100 using statistical methods (non-linear optimization) with a predetermined target made up of a predefined number of accurately determined elements and two rotation positions. In contrast to the conventional targets, the present invention is preferably configured to utilize a number of random unknown local features 102 (that are part of the vehicle wheel 100, or are temporarily marked on the vehicle wheel 100) and images of the wheel 100 moved between two or more rotational positions to determine the AOR for each imaged vehicle wheel 100. While there may be a greater error in the measurement of random local features 102 in each image, as compared to predetermined targets, given that the error is randomly distributed the AOR for the vehicle wheel 100 can be accurately determined.

There are two primary assumptions that permit resolution of initially undetermined reference or control points in a non-target based optical wheel alignment system. First, the random local features 102 (once identified on a vehicle wheel 100) do not change position relative to each other in the wheel-based Cartesian coordinate system for each rotational position of the vehicle wheel 100, and second, the AOR remains the same between each rotation position of the vehicle wheel 100.

The following table details some of the mathematical relationships that are used in computing the AOR for a vehicle wheel 100 from an image including a number of identified random local features 102. The relationships set forth in the table describe the mapping between reference points associated with the identified random local features 102 on the vehicle wheel 100, and where they are projected to on a plane in the viewing imaging component 20.

| Position of wheel | Reference Points in Wheel Coordinates | Wheel Transform | Reference Points in Imaging Component Coordinates | Fl, focal length Cx, lens X center Cy, lens Y center Imaging Component model | Reference Points in Image Coordinates |
|---|---|---|---|---|---|
| Position 1 | [x, y, z] | [Tx, Ty, Tz, Rx, Ry, Rz]$^1$ AOR[a, b, c] | [i, j, k]$^1$ | [Fl, Cx, Cy . . . ] | [u, v]$^1$ |
| Position 2 | [x, y, z] | [Tx, Ty, Tz, Rx, Ry, Rz]$^2$ AOR[a, b, c] | [i, j, k]$^2$ | [Fl, Cx, Cy . . . ] | [u, v]$^2$ |
| Position 3 | [x, y, z] | [Tx, Ty, Tz, Rx, Ry, Rz]$^3$ | [i, j, k]$^3$ | [Fl, Cx, Cy . . . ] | [u, v]$^3$ |

The following are definitions of the terms in the above table:

Reference Points In Wheel Coordinates: This is a list of reference points derived from characteristics of the identified random local features 102 in the wheel coordinate system which corresponds to the wheel-based Cartesian coordinate X, Y. Z axes. The wheel coordinate system is determined by a method of cross products (previously described) from identified random local features 102 found in the image. Each identified random local feature 102 coordinate x, y, z is initially unknown and determined via statistical methods, however, once established, the identified random local feature 102 coordinates x, y, z remain the same for all positions of the vehicle wheel 100.

Wheel Transform: The list of reference points in wheel coordinates is converted using the Wheel Transform to a coordinate system i, j, k of the imaging component 20 which acquired the image. The Wheel Transform [Tx, Ty, Tz, Rx, Ry, Rz] has three translation parameters Tx, Ty, Tz and three rotation parameters Rx, Ry, Rz (commonly referred to as pitch, yaw, and roll). The Wheel Transform is different for each position and orientation of the vehicle wheel 100 and is initially unknown and determined via statistical methods.

Reference Points in Imaging Component Coordinates: This is the list of reference points in imaging component 20 coordinates i, j, k where i is horizontal to image plane, j is vertical to image plane and k is perpendicular to image plane out the front of the imaging component 20. This is an intermediate result used to illustrate how the reference points are converted from target coordinate system coordinates to the imaging component coordinate system coordinates.

Imaging Component Model: The imaging component model converts the list of reference points from the Imaging Component Coordinate System i, j, k to an Image Coordinate System u, v. The imaging component model includes parameters which are determined during a factory calibration process for each imaging component 20. These include the lens focal length and other known lens parameters.

Reference Points in Image Coordinates: This is the list of reference points in the Image Coordinate System coordinates u, v which is the two dimensional location on the imaging element of the imaging component 20 after each local feature in three dimensional space has been mapped through the imaging component model. These reference points are measured in the image and are known when determining the axis of rotation.

Axis of Rotation (AOR): The vehicle wheel AOR a, b, c is determined using the Wheel Transforms between each of the observed positions of the vehicle wheel 100. A primary assumption is that the AOR will be the same between all the observed positions.

The preferred method employed by the present invention for determining the AOR for a vehicle wheel 100 from a set of identified random local features 102 requires that the after the wheel coordinate system is established, an initial guess is made to identify the location x, y, z of each of the identified random local features 102 in the wheel coordinate system for the first wheel position. Next, an estimate of the Wheel Transform for first position [Tx, Ty, Tz, Rx, Ry, Rz] is calculated. Using a conventional optimization process, an initial estimate for the Wheel Transforms is determined for the remaining observed wheel positions.

There is a set of error terms for each observed vehicle wheel position which is the difference between the measured reference points in the image and the projected reference points (i.e., the reference points in target coordinates run through the Wheel Transform and Imaging Component Model). There is a set of error terms for each of the AOR vectors associated with each observed vehicle wheel position. Preferably, using conventional error minimization and optimization techniques, the reference points in target coordinates and the Wheel Transforms is adjusted until the error terms are minimized to within an acceptable tolerance.

Finding an initial guess for the Wheel Transform and reference points in wheel coordinates depends entirely on estimating the reference points in the Imaging Component Coordinate System. This requires distance information which can be estimated between the imaging component 20 and the associated vehicle wheel 100 in several ways. For front wheels, the approximate position of the vehicle wheel 100 is known based on a measured relationship between the imaging components 20 of the imaging system 22 and a vehicle lift rack 42 or floor location upon which the vehicle is disposed. The approximate position of the imaging component 20 relative to a turn plate 46 on the lift rack 42 (or secured to the floor) is known. For the rear vehicle wheels, it is known that the vehicle is disposed on the lift rail 44 of the lift rack 42, (or is approximately straight behind the front wheels if disposed on the floor), hence the location of the vehicle wheel 100 in the image may be correlated with the approximate distance from the imaging component 20.

An alternative method for approximating distance information is to identify a perimeter wheel rim in the image from the imaging component 20, and to determine the diameter of the wheel rim, in pixels, verses either a nominal rim diameter (i.e., 15') or a rim diameter based on the vehicle-type selected by the alignment system, as observed at a known distance. The comparison provides an approximate estimate of the distance from the imaging component 20 to the imaged wheel rim.

Once an estimate of the distance is obtained, it is possible to provide an initial guess using the following process: First, the reference points are undistorted in image coordinates U, v using an inverse imaging component model (notated as u', v'). Next, an estimate of the imaging component coordinate system coordinates i, j, k is calculated from the undistorted reference points using equations i=u'k/FL and j=v'k/FL, where FL is the lens focal length for the imaging component 20. The k coordinate is estimated based on approximate distance to the center of the observed vehicle wheel 100 and where the reference point is in the image relative to the center of the vehicle wheel in the image.

Next, from the Imaging Component Coordinate System, the Wheel Coordinate System is established using conventional methods used to determine coordinates in a lift rack coordinate system. As previously described, a first reference point is selected to be the origin of the new coordinate system. A second reference point is selected to establish the X-axis. A third reference point is selected in the general direction of the Y-axis. Using a cross product between the X-axis vector and the approximate Y-axis vector determines the Z-axis. Using a second cross product between X-axis and the determined Z-axis identifies the actual Y-axis. Conventional methods, such as described in U.S. Pat. No. 6,064,750 to January et al., herein incorporated by reference, may be utilized to determine an Imaging Component-to-Wheel transform. The "Reverse" of this transform is the estimated Wheel Transform.

Finally, the reference points are found in the target coordinate system by transforming the reference points in imaging component coordinates to the wheel coordinate system using the Imaging Component-To-Wheel transform previously identified. The location of the reference points in the wheel coordinate system for the image of the vehicle wheel 100 in subsequent positions are the same as the locations found in the first vehicle wheel position. Conventional computations on changes in location of the identified reference points in the imaging component coordinate system from one wheel position to the next yield the AOR information for the vehicle wheel, from which vehicle wheel alignment angles can be subsequently determined.

A further alternate embodiment of the non-contact vehicle wheel alignment system of the present invention includes the use of range or distance information between the imaging components 20 and the observed vehicle wheel or optical target in the calculations of vehicle wheel alignment angles. Specifically, range or distance information (i.e., z-distance) is directly acquired for each pixel (i.e., x, y) in an image of a vehicle wheel 100 captured by an imaging component 20, without the need for a complex triangulation procedure. The range or distance information identifies the axial distance between the light sensing detectors in the imaging component 20 and a corresponding point in the observed field of view. Imaging components 20 configured to provide this type of range or distance information for each image pixel are manufactured by Canesta, Inc. of Palo Alto, Calif., and are set forth and described in U.S. Pat. No. 6,323,942 B1 to Bamji, herein incorporated by reference.

One of the essential parts of any imaging component based wheel alignment system 10 is compensating for distortion of the image due to the imaging component lens and other optical components that may be in place such as mirrors or prisms. The fundamental perspective equations (without distortion) are:

$u = FL * X/Z$ $v = FL * Y/Z$ where:
(u, v) is the coordinate of the object on the imaging component plane;
(X,Y,Z) is the coordinate of the object in 3D space relative to the imaging component; and
FL represents the focal length.

Preferably, an imaging component 20, configured to provide range or distance information, provides as an output (u, v) and Z for any object in an image. Directly providing the Z value for each pixel in an image greatly reduces the complexity of the necessary equations and subsequently all the derivatives of these equations that account for image distortion. The net effect is a much improved method for determining the lens distortion, and ultimately to improved measurements of an optical target or vehicle wheel.

Preferably, in the processing of the lens distortion equations, as well as the processing of the optical targets (after the lens distortion has been determined), non-linear optimization techniques are used. As described above, these require an initial guess to identify the location x, y, z of each local feature to seed the optimization. Providing range information directly from the imaging component 20 greatly improves the initial guess used to seed the optimization and thus improves the end result.

For example, when using conventional planar optical targets, the optimization could be further constrained by using the range information directly received from the imaging component 20 to assure that the identified reference points measured using the imaging component 20 are, in-fact, planar. Non-planar reference points would indicate a possible source of error. For example, range information can be utilized as an aid in identifying bent or damaged planar optical targets. Under a test condition, the desired range to each reference point on the target surface is known, and the wheel alignment system is configured to implement checks to determine whether the target is, in-fact, planar. If the optical target is not planar, a warning can be displayed to the user to indicate a new optical target may be required.

Figure 11:
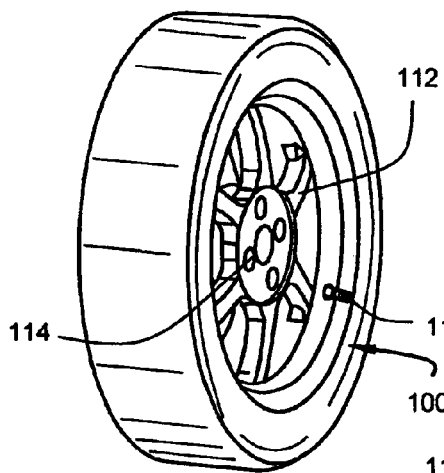
FIG. 11 is a perspective representation of a vehicle wheel incorporating identifiable three-dimensional features.

To determine vehicle wheel position from a three-dimensional image (i.e., an image having x, y, and z information for each pixel), the same sort of random local features 102 can be used as are described, provided they have an identifiable three-dimensional position, from which an identifiable reference point can be determined. For example, as shown on FIG. 11, instead of visual features such as color markings or mud-spatters, unique and identifiable three-dimensional shapes such as vehicle wheel valve stems 110, wheel rim spokes 112, and lug nuts 114 can be used as random local features from which identifiable reference points can be calculated. The identifiable reference points need not correspond directly with the observed local features, and may be merely identified by a positional relationship to an observed local feature.

Figure 12:
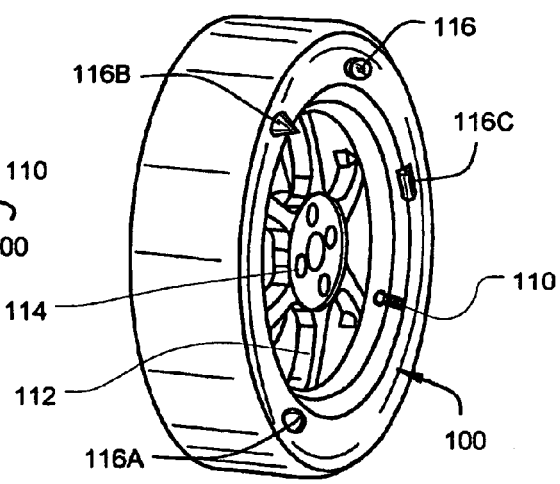
FIG. 12 is a perspective representation of the wheel of FIG. 11, on which removable three-dimensional features are removably secured.

Alternatively, as shown in FIG. 12, disposable, adhesive three-dimensional elements or bumps 116 may be removably secured to the to the sidewall of the vehicle wheel 100, similar to chair casters. The adhesive bumps 116 are preferably composed of a bright, reflective material, facilitating identification in an image. To improve accuracy, the adhesive bumps 116 could have a hemispherical shape, such as shown at 116A, whose center can be calculated from multiple surface points. Adhesive bumps 116 may optionally consist of shapes other than hemispherical (116A). For example, conical adhesive targets 116B or hemi-cylindrical adhesive targets 116C can also be located accurately by matching three-dimensional points to a single equation.

Alternatively, faceted targets mounted to the vehicle wheel 100 can have their position accurately determined from multiple reference points. The predetermined model for a faceted target may consist of a group of planes and the relationships between the planes. These shapes can also be adapted to normal two-dimensional vision systems for accurate location as described in the next section.

The ability for an imaging system 22 to acquire range and distance information permits the incorporation of optional features into an optical vehicle wheel alignment system 10. For example, imaging components 20 configured to acquire range and distance information may be utilized as inspection devices to identify deformities in the vehicle wheels 100 such as bent rims or tire bubbles. The same sensor may optionally examine the amount of bulge in the base of a tire to determine if the tire is badly under inflated, signaling the vehicle wheel alignment system 10 to prompt the user to check the air pressure of the tire.

With each embodiment of the present invention wherein an imaging system 22 is configured to observe a vehicle wheel 100 without the attachment of a predetermined optical target 24 there to, i.e., wherein an imaging system 22 is configured to directly identify reference points on the vehicle wheel from random local features, or from three-dimensional features of the vehicle wheel, it is preferred that the imaging system 22 be configured to determine if sufficient points of interest (i.e. random local features or three-dimensional points) are present in an image before calculating vehicle wheel alignment angles. If sufficient points of interest are found, nothing additional needs to be applied. However, if the imaging system 22 initially determines that there are not sufficient points of interest (or subsequently, such as after the vehicle wheel is rolled from a first position to a second position), the imaging system 22 provides a signal to the vehicle wheel alignment system to alert the user that one or more observable features, such as targets must be removably secured to the vehicle wheels. These observable features may be predetermined optical targets, or discrete target elements such as adhesive bumps 116, identifiable stickers, or other markings.

Gradient Targets

Figure 13:
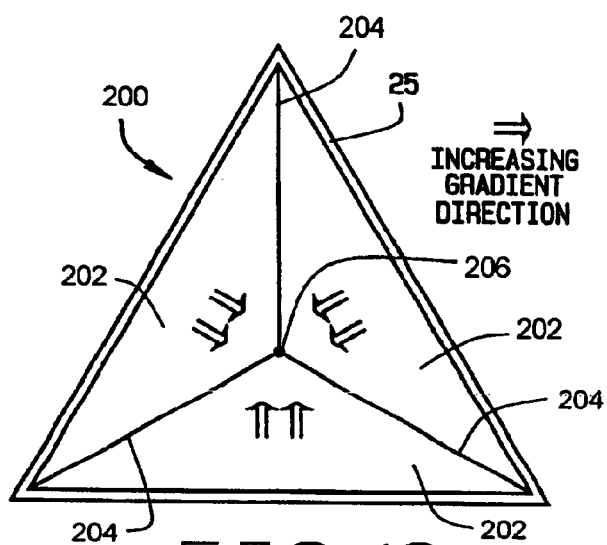
FIG. 13 is a representation of the face of an improved planar gradient target of the present invention configured with three distinct planar gradient regions.

If a predetermined optical target 24 is required to be removably secured to a vehicle wheel, an improved optical target element 200 of the present invention, shown in FIG. 13, is disclosed for use on the optical target 24. The improved optical target element 200 provides a high percentage of useful image pixels for computation of the target position and orientation. The improved optical target element 200 replaces the conventional optical elements 26 on an optical target 24 with two or more adjacent linear brightness gradients 202 to build up pseudo-geometric structures, instead of black and white brightness regions or optical elements 26. The use of linear brightness gradients 202 in place of the optical elements 26 permits a precise calculation of the sub-pixel image location of a brightness peak within each linear brightness gradient 202 by the imaging system 22.

Each linear brightness gradient 202 is used to fill in a two dimensional planar area on the target face 25. This creates a three-dimensional surface defined by an "x" position, a "y" position, and a brightness value. When a linear brightness gradient 202 is viewed in images of the target element 200 captured at different viewing angles, and with perspective distortions, the linear brightness gradient 202 remains linear in the image and is readily identifiable. In addition to exhibiting perspective and rotation invariance characteristics, a major advantage of a linear brightness gradient 202 on an optical target element 100 is the large number of pixels present in an image of the optical target that can be utilized in parallel to fit a single equation. This yields greater accuracy than fitting a single line of pixels to a brightness gradient.

Preferably, to derive one or more highly accurate control points from an optical target element 200 having multiple planar brightness gradients 202, two of the planar brightness gradient regions 202 are disposed adjacent to each other, such that each brightness gradient region has the same brightness level at each point along a common edge line 204 created where they meet. For example, the common edge line 204 may have a single brightness along a length, or may have an increasing brightness along a length. This creates a dual linear brightness gradient. During image processing by the imaging system 22, a representative plane equation is determined for each brightness gradient region 202, based on the corresponding pixels in an image.

The resulting plane equation for each brightness gradient 202 is evaluated to identify one or more common edge lines 204, corresponding to the common edge of the adjacent brightness gradients 202, to produce a high precision control line equation in image space. Preferably, by placing together three or four planar brightness regions 202 on a target element 200, two or three control line equations can be generated which intersect in one highly accurate control point 206.

Figure 15:
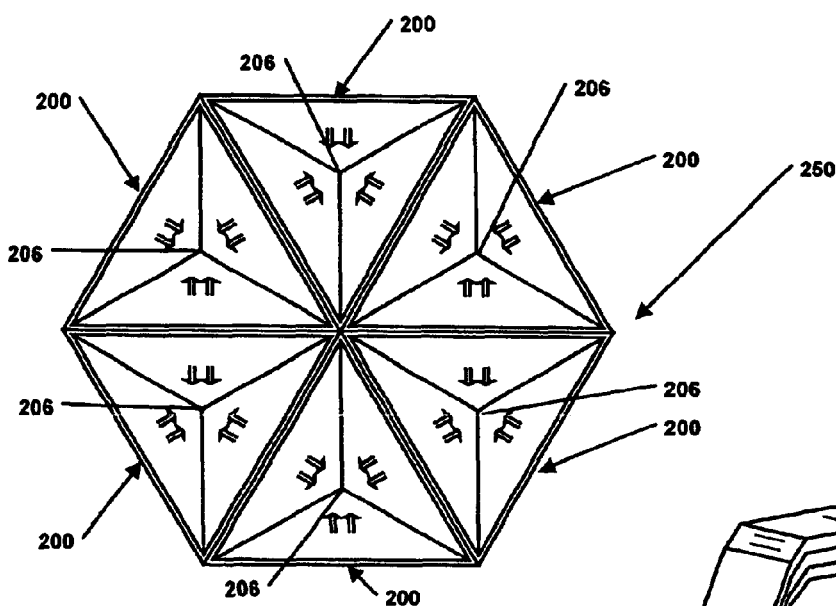
FIG. 15 is an enlargement of a portion of FIG. 14, illustrating the arrangement of the target element.
Figure 14:
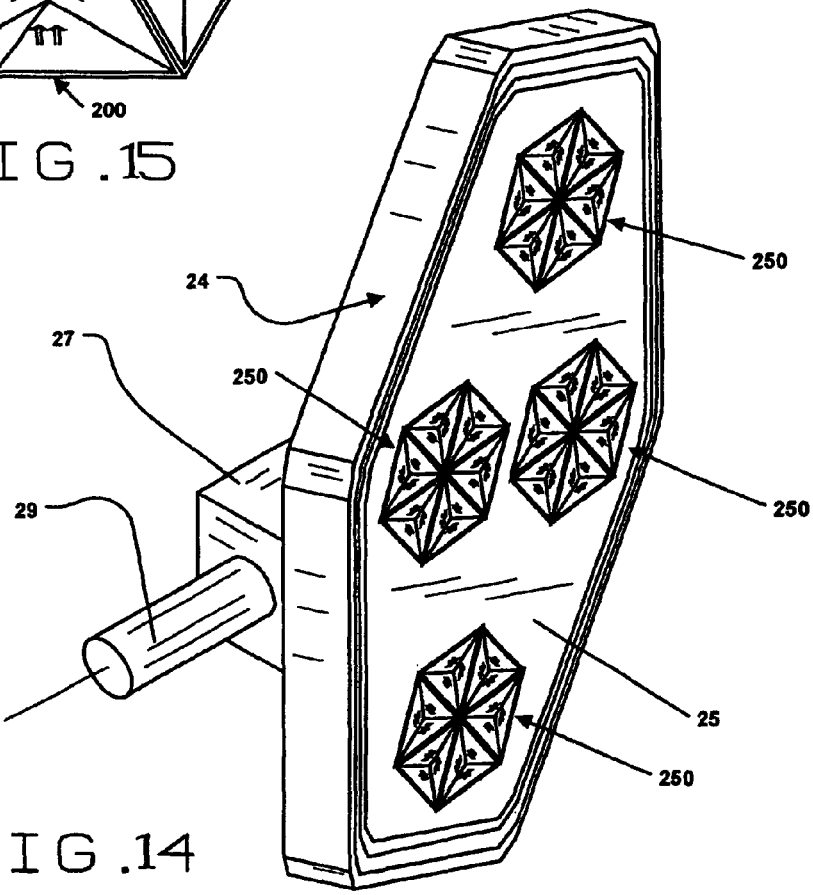
FIG. 14 is a representation of an optical target utilizing the target elements of FIG. 13.

The preferred target element 200 configuration for three control line intersection, shown in FIG. 13, is an equilateral triangle consisting of three triangular gradient planes 202 whose brightest point, i.e. the control point 206, is at the center of the equilateral triangle. A further advantage is that the location of the control point 206 of each equilateral triangle target element 200 can be independently determined by using a gray scale centroid calculation, providing an inherent confirmation of the line equation intersection calculations. As shown in FIGS. 14 and 15, a set of six target elements 200 can be used to tessellate a hexagon 250 to yield six control points 206, and multiple sets of target elements 200 may be disposed on the face 25 of a target 24, replacing the conventional high-contrast target elements 26.

Figure 16:
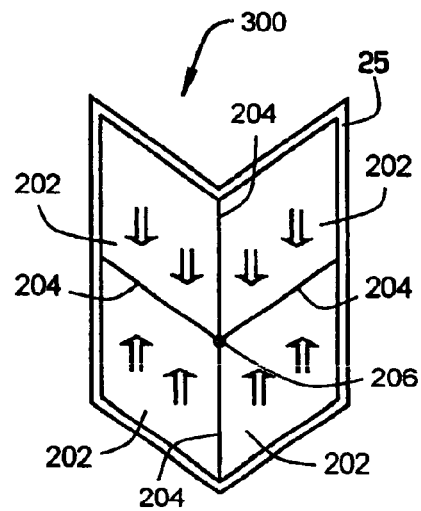
FIG. 16 is a representation of the face of an improved planar gradient target of the present invention configured with four distinct planar gradient regions.

An alternate planar gradient brightness target element 300, shown in FIG. 16 consists of four diamond shaped gradient planes 202 that generate two precision control lines 204 intersecting at a 90 degree angle to produce a control point 206. This produces a nested double "V" configuration, which may be replicated to produce a sequence of control points 206. As shown in FIG. 16, the brightest pixels in each brightness gradient 202 are disposed along a common edge boundary. The position and orientation of target element 300 can be computed to a lower accuracy by fitting multiple rows of pixels in an image of the target element 300 to dual linear brightness gradients to estimate the location of the control line 204 defined by the brightest gradient points.

Figure 17:
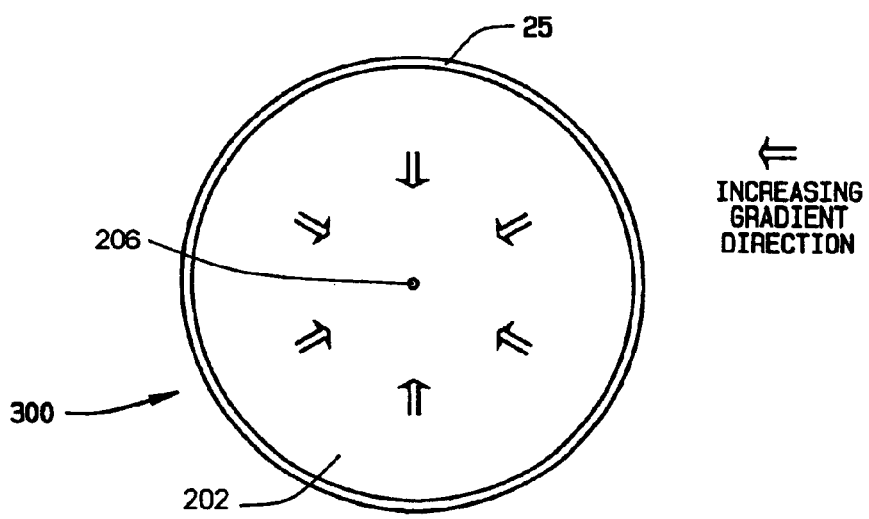
FIG. 17 is a representation of the face of an improved conical gradient target of the present invention configured with a single gradient region.

A next alternate configuration of the gradient brightness target element 400, shown in FIG. 17, does not provide a planar-fit brightness gradient, but rather uses a conical-fit brightness gradient having a radial center point. This configuration provides a circular target element with a radially varying brightness gradient, such that the brightest pixel, i.e., the control point 206, is located at the gradient vertex which corresponds to the radial center point. Similar to the triangular configuration gradient brightness target element 200 shown in FIG. 13, the conical brightness gradient configuration permits an independent calculation of the control point 206 using a conventional gray-scale centroid calculation. To calculate the position of the control point 206, more precisely, multiple centroids can be calculated at multiple fixed brightness threshold intervals to produce annular bands, and the control point 206 location can be extrapolated from the family of circular or elliptical regions produced from the thresholding. The control point 206 is located at the centroid of the extrapolated region where the area approaches zero.

Once a set of control points 206 have been identified in a target image, the imaging system 22 is configured to perform conventional image processing procedures to compare the observed relationship between control points 206 with predetermined relationships of the target control points 206, and to determine a position and orientation in three-dimensional space of the target 26. Conventional processing further identifies the corresponding vehicle wheel alignment angles from the determined position and orientation of the target 26 in three-dimensional space.

To improve the accuracy of a gradient brightness target element 200, 300, 400 of the present invention, it is preferable that the darkest portion of the brightness gradient be selected at or above a threshold sufficient to avoid noise effects during image processing. For example, the darkest portion may be selected to have a brightness which is 20% of brightness of the lightest portion of the brightness gradient.

It is preferable that specialized statistical techniques be applied to reject the influence of outlier pixels (due to noise, dirt, etc.) in the image of each target element 200, 300, 400 captured by the imaging system 22 on the calculation of the fit equations.

Finally, it is preferable that individual pixels in the image captured by the imaging system 22 which lie within a first brightness region should be discarded from further calculations if they lie within a distance $D_p$ of an adjacent brightness region. The distance $D_p$ is variable, and is dependant primarily on the overall image sharpness. Discarding individual image pixels at the edges of each brightness region limits accuracy because these pixels may have the best information on the plane's slope due to their "leverage", and because they are the closest image pixels to the desired control line 106. However, because it is difficult to determine the exact point where edge effects have an impact, the safe approach is to discard extra pixels so there is little chance of edge effects. Because of the edge brightness matching property of the dual planar gradient approach, edge effects will be less drastic than with a high contrast black-white boundary on a conventional optical element 26.

To further increase the accuracy with which the control points 206 are located in a brightness gradient target element 200, 300, 400, a pattern matching model can be generated from an estimate of the tilt of the target surface 25. The pattern matching model consists of a three-dimensional shape in the image space, composed of surfaces, with the z-dimension corresponding directly to expected pixel brightness for each pixel in the brightness gradient. Unlike a typical pattern matching template, this is not quantized into individual pixels. However, similar to conventional techniques employed when using a pattern matching template, the pattern matching model is compared to sets of pixels in an image to identify a maximum correlation between pixel brightness and the pattern matching model. Since the pattern matching model is composed of planar gradients, the pattern matching model will rapidly converge on a corresponding set of pixels in the image, if present. This is implemented by matching slices of the image to slices of the pattern matching model, and moving the pattern matching model over the image by a relatively large number of pixels at a time, to line up a peak in an image slice with a peak in the pattern matching model slice. Sub-pixel resolution of the location of a brightness gradient 202 within an image can be achieved by continuing to reduce the size of these moves to below the size of a single pixel. Small angle image plane rotations can also be performed to improve the fit between the pattern matching model and the image, but may not be required if the initial estimate of the tilt of the target surface 25 is a close approximation to the actual tilt.

A practical advantage achieved through the use of gradient brightness target elements 200, 300, 400 is the ability to use a smaller optical target to achieve the same system accuracy as a larger high contrast optical target 24.

Camera Positions

In order to provide for unobstructed viewing of vehicle wheels and/or any optical targets 24 mounted there on, the imaging components 20 of the imaging system 22 may be disposed in a variety of positions about a vehicle undergoing inspection or alignment. For example, the optical imaging vehicle wheel alignment system 10 may be configured to provide at least one imaging component 20 for each vehicle wheel. Each imaging component 20 is preferably positioned such that an outer surface of an associated wheel is present in a Field Of View (FOV) of the imaging component 20. Each imaging component 20 is optimally positioned such that an outer edge of the wheel is present in the FOV of the imaging component 20 while the vehicle is on a lift rack 44, while the wheel is steered to the left or right, or while the vehicle is elevated to permit the vehicle suspension components to hang suspended above the lift rack rails 42 or shop floor.

Turning to FIG. 18, an exemplary placement for four imaging components 20FL, 20RL, 20FR, and 20RR of an imaging system 22, corresponding to each vehicle wheel 100, is shown. Preferably, each of the imaging components 20 is located at ground level, to look up at each of the associated vehicle wheels 100 of the vehicle, so that the FOV for each imaging component 20 is not blocked by the presence of vehicle body components. The configuration shown in FIG. 18 works best with no lift rack 44 or with the lift rails 42 of a lift rack 44 at a low position so the treads of the vehicle tires do not obstruct a clear FOV of the wheel surfaces. Preferably, in the embodiment shown in FIG. 18, each imaging component 20 is displaced laterally from the lift rails 42 of the lift rack 44, with the front two imaging components 20F slightly rearward of the associated front wheel locations on turnplates 46, to increase their viewing angle with respect to the wheel. Placement of the front two imaging components 20FR and 20FL slightly rearward of each turnplate 46 facilitates detection of wheel angles, due to the fact that the most important wheel position and orientation data is normal to the outer surface of the wheel.

The two rear imaging components 20RR and 20RL are disposed adjacent the location of the rear wheels 100 for a vehicle with an average wheelbase. Preferably, as shown in FIG. 18, the two rear imaging components 20RR, 20RL are provided with rotating turret mechanisms to permit the imaging components 20RR, 20RL to rotate in the floor plane and to accommodate vehicles of different wheelbases, while maintaining the rear vehicle wheels in a tight field of view.

Placing the two rear imaging components 20RR and 20RL in rotating turret mechanisms provides several advantages. The rotating turret mechanisms may be constructed with a small size, which keeps the rear imaging components 20RL and 20RR from occupying excessive space in a service bay. The rear imaging components 20RL and 20RR can be placed immediately adjacent the lift rack 44 within normal service bay spacing. Finally, being small and low to the ground, the rear imaging components 20RR and 20RL and associated rotating turret mechanisms may be rigidly mounted to the floor to avoid misalignment or damage by being enclosed within a protective cage. The protective cage can be integrated with a console, a storage unit, or other bay equipment.

Those of ordinary skill in the art will recognize that the placement of the imaging components 20 need not be limited to the configuration shown in FIG. 18, and that a wide variety of configurations are suitable, provided that the imaging components 20 are capable of obtaining images of the required vehicle wheels and any associated targets having sufficient resolution for image processing.

Independent of the specific configuration and placement of the imaging components 20 of the imaging system 22, it is necessary to identify the positional relationships between each of the imaging components 20 and the vehicle lift rack 44 or vehicle position. Knowing the imaging component positional information allows measurements to be transformed to a common coordinate system where alignment angles can be determined.

If the imaging components 20 are disposed apart from the vehicle lift rack 44, it is preferred that they be in a fixed location. Provided the imaging components 20 are in a fixed location, the actual location relative of the imaging components 20 to the vehicle lift rack 44 and relative to each other can be established using a field calibration procedure substantially similar to that utilized by conventional non-contact optical vehicle wheel alignment systems, such as shown in U.S. Pat. No. 5,724,128 to January.

If the imaging components 20 are disposed on the vehicle lift rack 44, or coupled to it, it is preferable to provide a means for dynamically locating each imaging component 20 relative to another. Optionally, each imaging component 20 could be dynamically located relative to adjacent imaging components 20 using conventional displacement sensor technology, such as described in U.S. Pat. No. 5,488,472 to January, or alternatively, each imaging component 20 could be configured to observe a target disposed on an adjacent imaging component 20, to acquire the necessary information.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or other computer readable storage medium, wherein, when the computer program code is loaded into and executed by a computer, the computer becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A vehicle wheel alignment apparatus for determining the alignment of one or more wheels of a vehicle, said apparatus comprising:

at least one optical target adapted to provide images functionally related to vehicle wheel alignment parameters, said at least one optical target having at least one brightness gradient disposed on at least one target face, said brightness gradient including three or more regions, each having a discrete brightness characteristic;

at least one camera disposed to generate at least one image of said at least one optical target, said camera configured with an imaging device sensitive to detect said at least one brightness gradient; and a computer operatively connected to said at least one camera, said computer configured to receive and process said at least one image of said optical target to determine one or more optical target parameters; and said computer configured to utilize said one or more optical target parameters to calculate one or more vehicle wheel alignment angles.

2. The vehicle wheel alignment apparatus of claim 1 wherein said at least one brightness gradient is a conical-fit brightness gradient, and wherein a gradient direction established by said regions defines at least one control point.

3. The vehicle wheel alignment apparatus of claim 1 wherein said optical target includes a plurality of brightness gradients; and wherein adjacent brightness gradients disposed on said target face each have a common edge, and each have an equal brightness at any point along said common edge.

4. The vehicle wheel alignment apparatus of claim 3 wherein a plurality of said common edges intersect to define at least one control point disposed on said target face.

5. The vehicle wheel alignment apparatus of claim 3 wherein at least one optical target includes at least a first brightness gradient, a second brightness gradient, and a third brightness gradient, each of said first, second, and third brightness gradients having two common edges.

6. The vehicle wheel alignment apparatus of claim 3 wherein at least one optical target includes at least a first brightness gradient, a second brightness gradient, a third brightness gradient, and a fourth brightness gradient, each of said first, second, third, and fourth brightness gradients having at least two common edges.

7. A method of determining the alignment of a wheel of a vehicle, comprising the steps of:

mounting a known optical target to the wheel on the vehicle, said known optical target having at least one set of three or more brightness gradients disposed on a target surface, each of said brightness gradients in said set having a discrete gradient direction and at least one common edge with an adjacent brightness gradient, said brightness gradients disposed such that each of said common edges intersects at least one additional common edge to define one or more control points on said optical target;

obtaining at least one image of said optical target in which at least a portion of said target surface is included;

estimating from said image of said optical target a plurality of control lines in said image corresponding to said common edges of said adjacent brightness gradients;

calculating intersection points for each of said estimated control lines in said image, said calculated intersection points representative of said one or more control points on said optical target; and determining from said calculated intersection points the alignment of said wheel.

8. The method of claim 7 further including the steps of:

calculating a location for one or more centroid points on said optical target surface; and comparing said calculated location with said one or more control points.

9. A method of determining the alignment of a wheel of a vehicle, comprising the steps of:

mounting a known optical target to the wheel on the vehicle, said known optical target having one or more brightness gradients disposed on a target surface, each of said brightness gradients having a radial gradient direction defined by two or more concentric regions of brightness characteristics, and configured to provide a center point on said optical target;

obtaining at least one image of said optical target in which at least a portion of said target surface is included;

estimating from said image of said optical target a plurality of control points in said image, each of said estimated control points corresponding to at least one of said center points; and determining from said estimated control points the alignment of said wheel.

10. The method of claim 9 further including the steps of:

calculating a location for one or more centroid points on said optical target surface; and comparing said calculated location with said one or more control points.

11. An improved vehicle wheel alignment system optical target having a base, a face secured to the base, and a mounting structure associated with the base configured to removably secure the target to a vehicle wheel adaptor, the improvement comprising:

at least one brightness gradient disposed on the target face, said brightness gradient configured to establish a discrete gradient direction and wherein said brightness gradient establishes at least one target control point.

12. The improved vehicle wheel alignment system optical target of claim 11 further including three or more brightness gradients, each of said brightness gradients having a discrete gradient direction and having at least one common edge with an adjacent brightness gradient;

wherein each common edge defines a control line; and wherein each of said defined control lines intersects at least one additional defined control line at one of said at least one said target control points.

13. The improved vehicle wheel alignment system optical target of claim 11 wherein said at least one brightness gradient has a radial brightness gradient direction defining a center point; and wherein said center point corresponds to said at least one target control point.

14. The improved vehicle wheel alignment system optical target of claim 11 wherein said at least one brightness gradient has a centroid, said centroid corresponding to said at least one target control point.

15. The vehicle wheel alignment apparatus of claim 7 further including at least one target disposed on said at least one wheel, and wherein said at least one optical time-of-flight sensor is configured to obtain data representative of a distance between said imaging element and at least one point on said at least one target.

16. The vehicle wheel alignment system of claim 15 wherein said at least one target has a three-dimensional shape configured to provide a plurality of asymmetrical distance data points to said at least one optical time-of-flight sensor.

17. The vehicle wheel alignment system of claim 15 wherein said at least one target optically contrasts with said vehicle wheel.

18. A vehicle wheel alignment apparatus for determining the alignment of at least one wheel of a vehicle, said apparatus comprising:

at least one imaging component disposed to receive at least one image of said at least one wheel, said imaging component configured with an imaging element adapted to obtain an optical image of said at least one wheel;

wherein said at least one imaging component is further configured to obtain data representative of a distance between said imaging element and at least one point on said at least one wheel;

a computer operatively connected to said at least one imaging component, said computer configured to process said at least one image together with said obtained distance data to determine one or more wheel alignment measurements; and a plurality of targets secured to said at least one wheel, and wherein said at least one imaging component is configured to obtain data representative of distances between said imaging element and at least one point on each of said plurality of targets.

19. The vehicle wheel alignment system of claim 18 wherein at least a portion of said plurality of targets are three-dimensional features of said at least one wheel.

20. The vehicle wheel alignment system of claim 18 wherein at least a portion of said plurality of targets are three-dimensional target elements removably secured to said at least one wheel.

21. The vehicle wheel alignment system of claim 15 wherein said imaging element is composed of a plurality of light-detecting pixels; and, said optical time-of-flight sensor includes, for each of said plurality of light-detecting pixels, associated elements adapted to obtain time-of-flight data, each of said associated elements providing a measure of distance from said associated light-detecting pixel to an object in a field of view.

22. A vehicle wheel alignment apparatus for determining the alignment of at least one wheel of a vehicle, said apparatus comprising:

at least one optical time-of-flight sensor disposed to receive at least one image of said at least one wheel, said optical time-of-flight sensor configured with an imaging element adapted to obtain an optical image of said at least one wheel;

wherein said at least one optical time-of-flight sensor is further configured to obtain data representative of a distance between said imaging element and at least one point on said at least one wheel; and a computer operatively connected to said at least one optical time-of-flight sensor, said computer configured to process said at least one image together with said obtained distance data to determine one or more wheel alignment measurements.

23. A vehicle wheel alignment apparatus for determining the alignment of at least one wheel of a vehicle, said apparatus comprising:

an optical imaging system configured to obtain at least one image associated with each wheel of a vehicle;

a processing system configured to process each of said images to identify a plurality of local features associated with each vehicle wheel; and said processing system further configured to utilize said plurality of identified local features to determine one or more vehicle wheel alignment angles; and wherein each of said plurality of local features is a random local feature disposed on a surface of said associated vehicle wheel.

24. A vehicle wheel alignment apparatus for determining the alignment of at least one wheel of a vehicle, said apparatus comprising:

an optical imaging system configured to obtain at least one image associated with each wheel of a vehicle;

a processing system configured to process each of said images to identify a plurality of local features associated with each vehicle wheel; and said processing system further configured to utilize said plurality of identified local features to determine one or more vehicle wheel alignment angles;

wherein said processing system is further configured to utilize a predetermined minimum number of said identified local features to determine said one or more vehicle wheel alignment angles; and wherein said processing system is configured to signal if said predetermined minimum number of local features is not identified in one or more of said images.

25. A vehicle wheel alignment apparatus for determining the alignment of at least one wheel of a vehicle, said apparatus comprising:

an optical imaging system configured to obtain at least one image associated with each wheel of a vehicle;

a processing system configured to process each of said images to identify a plurality of local features associated with each vehicle wheel; and said processing system further configured to utilize said plurality of identified local features to determine one or more vehicle wheel alignment angles; and wherein said processing system is configured to identify each of said local features as a three-dimensional local feature.

26. The vehicle wheel alignment apparatus of claim 25 wherein said processing system is configured to identify each of said local features by at least a two-dimensional position and brightness.

27. The vehicle wheel alignment apparatus of claim 25 wherein said processing system is configured to identify each of said local features by at least a two-dimensional position and a distance value.

28. The vehicle wheel alignment apparatus of claim 23 wherein said processing system is configured to utilize spatial relationships between said plurality of identified local features in each of said images to determine one or more vehicle wheel alignment angles.

29. The vehicle wheel alignment apparatus of claim 23 wherein said processing system is configured to identify, from a single image associated with each wheel, said plurality of local features associated with said vehicle wheel.

30. A method for determining the alignment of a vehicle, comprising:

obtaining a first image of each wheel of the vehicle in a first position and orientation;

processing each of said images to identify a plurality of local features associated with each vehicle wheel;

moving each of said vehicle wheels;

obtaining at least one subsequent image associated with each wheel of a vehicle;

processing each of said at least one subsequent image to identify said plurality of local features associated with each vehicle wheel; and utilizing said plurality of identified local features identified in each image to determine one or more vehicle wheel alignment angles.

31. The method of claim 30 for determining the alignment of a vehicle, further including the step of calculating a set of identified reference points for each vehicle wheel from said plurality of identified local features.

32. The method of claim 30 for determining the alignment of a vehicle wherein the step of utilizing includes determining positional changes of said identified local features between subsequent images to determine one or more vehicle wheel alignment angles.

33. The method of claim 32 for determining the alignment of a vehicle wherein the step of utilizing further includes determining an axis of rotation for each vehicle wheel from said determined positional changes.

34. The method of claim 32 for determining the alignment of a vehicle further including the step of establishing a coordinate system for each vehicle wheel from said first image of each vehicle wheel and from a selected subset of said plurality of local features, such that each of said plurality of local features has a fixed position within said established coordinate system.

35. The method of claim 34 for determining the alignment of a vehicle further including the step of calculating transformations between each of said established coordinate systems and an associated imaging system coordinate system to determine positional changes in said associated imaging system coordinate system of said identified local features between subsequent images.

36. The method of claim 30 for determining the alignment of a vehicle wherein the step of utilizing requires a predetermined minimum number of said identified local features to determine said one or more vehicle wheel alignment angles; and further including the step of providing a signal if said predetermined minimum number of local features is not identified in one or more of said images.

37. A method for measuring at least one vehicle wheel alignment angle using a non-contact imaging sensor, comprising:

obtaining an initial image of at least a portion of at least one vehicle wheel;

processing said initial image to identify a plurality of random features disposed on a surface of said at least one vehicle wheel; and determining if said processed initial image contains at least minimum information required for measuring at least one vehicle wheel alignment angle.

38. The method of claim 37 for measuring at least one vehicle wheel alignment angle wherein said determining step comprises:

determining if a minimum number of said plurality of random features are identifiable in said processed initial image.

39. The method of claim 37 for measuring at least one vehicle wheel alignment angle further including, responsive to said processed initial image failing to contain at least said minimum information required, the step of disposing at least one target element on said at least one vehicle wheel.

40. A vehicle wheel alignment apparatus for determining the alignment of at least one wheel of a vehicle, said apparatus comprising:

an optical imaging system configured to obtain one or more images of a vehicle undergoing alignment, each of said one or more images including at least a portion of a vehicle wheel;

a processing system configured to identify, in each of said one or more images, each of said vehicle wheel portions;

said processing system configured to locate a plurality of local features associated with a vehicle wheel in each of said images of each of said vehicle wheel portions;

said processing system configured to determine an acceptability of each of said images to identify one or more vehicle wheel alignment angles for each of said vehicle wheels;

wherein said plurality of local features associated with said vehicle wheel are each disposed on an optical target surface having a predetermined planar characteristic; and wherein said processing system is configured to utilize range information for each of said plurality of local features to identify one or more range measurements varying from said predetermined planar characteristic by at least a predetermined amount, indicative of a bent or damaged optical target, to determine an acceptability of each of said images to identify one or more vehicle wheel alignment angles for each of said vehicle wheels.

41. The vehicle wheel alignment apparatus of claim 1 wherein said discrete brightness characteristics vary uniformly between each of said regions.

42. The method of claim 7 wherein the step of estimating said plurality of control lines in said image includes identifying transition points between adjacent discrete gradient directions.

43. The method of claim 9 wherein a brightness of each of said brightness gradients varies uniformly in said radial gradient direction.

* * * * *

UNITED STATES PATENT AND TRADEMARK OFFICE
CERTIFICATE OF CORRECTION

PATENT NO. : 6,894,771 B1 Page 1 of 1
DATED : May 17, 2005
INVENTOR(S) : Daniel R. Dorrance et al.

It is certified that error appears in the above-identified patent and that said Letters Patent is hereby corrected as shown below:

Column 9,
Line 63, replace "15'" with -- 15" --.

Signed and Sealed this

Fourth Day of October , 2005

JON W. DUDAS
*Director of the United States Patent and Trademark Office*